United States Patent
Tsuji et al.

(10) Patent No.: US 10,626,895 B2
(45) Date of Patent: Apr. 21, 2020

(54) WORKING MACHINE

(71) Applicant: Kubota Corporation, Osaka (JP)

(72) Inventors: Kenichiro Tsuji, Osaka (JP); Shigeo Sakamoto, Osaka (JP); Toshimitsu Yazaki, Osaka (JP); Toshiya Tsuji, Osaka (JP)

(73) Assignee: Kubota Corporation, Osaka (JP)

( * ) Notice: Subject to any disclaimer, the term of this patent is extended or adjusted under 35 U.S.C. 154(b) by 96 days.

(21) Appl. No.: 15/718,890

(22) Filed: Sep. 28, 2017

(65) Prior Publication Data
US 2018/0094656 A1  Apr. 5, 2018

(30) Foreign Application Priority Data

Oct. 3, 2016  (JP) .................... 2016-195854

(51) Int. Cl.
| | | |
|---|---|---|
| E02F 9/22 | (2006.01) | |
| F15B 21/00 | (2006.01) | |
| B62D 25/16 | (2006.01) | |
| B62D 49/00 | (2006.01) | |
| B62D 25/18 | (2006.01) | |
| E02F 9/08 | (2006.01) | |
| A01B 71/08 | (2006.01) | |
| E02F 9/16 | (2006.01) | |
| F16L 11/00 | (2006.01) | |

(52) U.S. Cl.
CPC ............ F15B 21/005 (2013.01); B62D 25/16 (2013.01); B62D 25/18 (2013.01); B62D 49/00 (2013.01); E02F 9/2267 (2013.01); E02F 9/2275 (2013.01); A01B 71/08 (2013.01); E02F 9/0858 (2013.01); E02F 9/16 (2013.01); F16L 11/00 (2013.01); Y10T 137/6895 (2015.04)

(58) Field of Classification Search
CPC ................. E02F 9/2275; E02F 9/2267; Y10T 137/6895; B62D 25/16
See application file for complete search history.

(56) References Cited

U.S. PATENT DOCUMENTS

| | | | |
|---|---|---|---|
| 7,419,186 B2 * | 9/2008 | Murakami | ............ E02F 9/2275 180/89.13 |
| 8,047,760 B2 * | 11/2011 | Roan | ......................... E02F 3/34 414/686 |
| 9,206,585 B2 * | 12/2015 | Kurushima | ............. E02F 3/325 |
| 2008/0296032 A1 | 12/2008 | Masumoto | |

FOREIGN PATENT DOCUMENTS

| | | |
|---|---|---|
| JP | H05-14770 U | 2/1993 |
| JP | H07 117586 A | 5/1995 |
| JP | 2002 250303 A | 9/2002 |

(Continued)

OTHER PUBLICATIONS

Extended European Search Report in counterpart European Application No. 17 193 692.5 dated Feb. 2, 2018 (10 pages).

*Primary Examiner* — Kevin F Murphy
(74) *Attorney, Agent, or Firm* — Osha Liang LLP

(57) ABSTRACT

A working machine includes a vehicle body, a travel apparatus provided to a rear portion of the vehicle body, a fender provided above the travel apparatus, and hydraulic piping that is disposed between the travel apparatus and the fender and that extends from a front-portion side to a rear-portion side of the fender.

14 Claims, 14 Drawing Sheets

(56) References Cited

FOREIGN PATENT DOCUMENTS

| | | |
|---|---|---|
| JP | 2004-345372 A | 12/2004 |
| JP | 2007 314980 A | 12/2007 |
| JP | 2008 006979 A | 1/2008 |
| JP | 2008-297766 A | 12/2008 |
| JP | 2010284137 A | 12/2010 |
| JP | 2013 154739 A | 8/2013 |
| JP | 2016-089334 A | 5/2016 |

* cited by examiner

WORKING MACHINE

BACKGROUND

Technical Field

The present invention relates to a working machine such as a tractor.

Related Art

Conventionally known is a working machine disclosed in patent literature 1.

A working machine (tractor) disclosed in patent literature 1 is provided with an auxiliary control valve for supplying a hydraulic fluid to a rear-mounted implement mounted to a vehicle body rear portion and a front-mounted-implement control valve for supplying a hydraulic fluid to a front-mounted implement mounted to a vehicle body front portion. The auxiliary control valve is disposed to the rear portion of the vehicle body, and the front-mounted-implement control valve is disposed to the front portion of the vehicle body.

CITATION LIST

Patent Literature 1: JP 2010-284137 A

SUMMARY

However, depending on specifications of the working machine, it may be difficult to ensure a space for extending hydraulic piping rearward from the front-mounted-implement control valve provided to the front portion of the vehicle body. In this situation, there is a need to provide to the front portion of the vehicle body an operation lever, separate from an operation lever provided in a vicinity of a driver's seat, for operating the front-mounted-implement control valve.

Furthermore, depending on the specifications of the working machine, it may be difficult to ensure a disposition space of the hydraulic piping even if no front-mounted-implement control valve is provided and it is attempted to extend hydraulic piping for the front-mounted implement forward from the auxiliary control valve provided to the rear portion of the vehicle body.

A working machine according to one or more embodiments of the present invention is provided with hydraulic piping that can smoothly supply a hydraulic fluid over a rear portion and a front portion of a vehicle body.

A working machine according to one or more embodiments of the present invention is provided with a vehicle body, a travel apparatus provided to a rear portion of the vehicle body, a fender that covers above the travel apparatus, and hydraulic piping that is between the travel apparatus and the fender and extends from a front-portion side to a rear-portion side of the fender.

Accordingly, because the hydraulic piping that is between the travel apparatus and the fender and extends from the front-portion side to the rear-portion side of the fender is provided, a disposition space of the hydraulic piping can be ensured to smoothly supply a hydraulic fluid over the rear portion and a front portion of the vehicle body.

DETAILED DESCRIPTION

Embodiments of the present invention are described below based on the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 14:
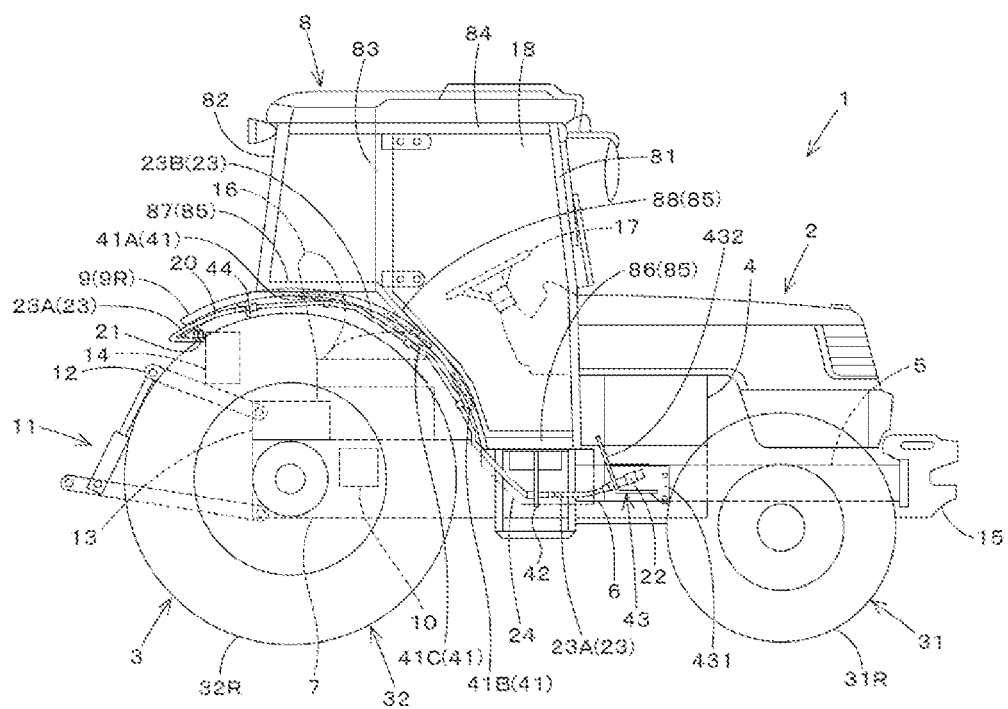
FIG. 14 is a side view of a working machine.

FIG. 14 is a side view illustrating a working machine 1 according to one or more embodiments. The working machine 1 of one or more embodiments is a tractor. However, the working machine 1 is not limited to a tractor and may be any farming machine (farming vehicle) such as a combine or a transplanter or a construction machine (construction vehicle) such as a loader.

Description is given below with a front side of a driver seated in a driver's seat 16 of the working machine 1 (the right side in FIG. 14) as forward, a rear side of the driver (the left side in FIG. 14) as rearward, a left side of the driver (the distal side in FIG. 14) as leftward, and a right side of the driver (the proximal side in FIG. 14) as rightward. Moreover, a horizontal direction that is a direction orthogonal to a front-rear direction of the working machine 1 (the distal direction in FIG. 14) is described as a width direction. Moreover, a direction of heading from a width-direction central portion of the working machine 1 to a right portion or a left portion is described as outward. In other words, outward is a direction in the width direction of heading away from the width-direction central portion of the working machine 1. Moreover, a direction opposite of outward is described as inward. In other words, inward is a direction in the width direction of approaching the width-direction central portion of the working machine 1.

As illustrated in FIG. 14, the working machine 1 is provided with a vehicle body 2 and a travel apparatus 3.

The vehicle body 2 has an engine 4, a vehicle-body frame 5, a clutch housing 6, and a transmission case 7. The vehicle-body frame 5 extends in a front-rear direction of the vehicle body 2. The engine 4 is mounted to the vehicle-body frame 5 and is disposed to a front portion of the vehicle body 2. The clutch housing 6 is connected to a rear portion of the engine 4. The transmission case 7 is connected to a rear portion of the clutch housing 6 and extends rearward. The transmission case 7 houses a transmission, a rear wheel differential apparatus, and the like.

The travel apparatus 3 has a front-portion travel apparatus 31 provided to the front portion of the vehicle body 2 and a rear-portion travel apparatus 32 provided to a rear portion of the vehicle body 2. The front-portion travel apparatus 31 is supported by the vehicle-body frame 5. The rear-portion travel apparatus 32 is supported by a shaft of the rear wheel differential apparatus extending from the transmission case 7.

The front-portion travel apparatus 31 has a right-front wheel 31R disposed to a right-front portion of the vehicle body 2 and a left-front wheel (not illustrated) disposed to a left-front portion of the vehicle body 2. The rear-portion travel apparatus 32 has a right-rear wheel 32R disposed to a right-rear portion of the vehicle body 2 and a left-rear wheel (not illustrated) disposed to a left-rear portion of the vehicle body 2. That is, in one or more embodiments, with the travel apparatus 3, both the front-portion travel apparatus 31 and the rear-portion travel apparatus 32 are a wheel-type travel apparatus. However, a configuration of the travel apparatus 3 is not limited to such a configuration; for example, the rear-portion travel apparatus 32 may be a crawler-type travel apparatus.

Figure 1:
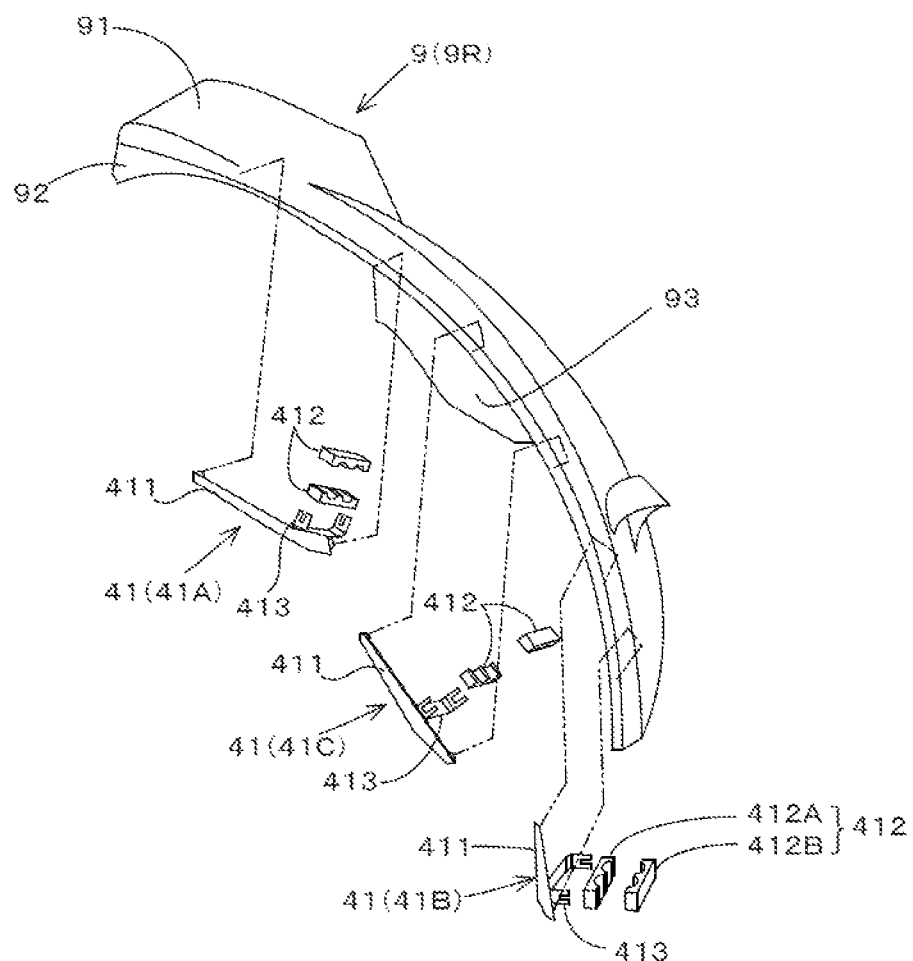
FIG. 1 is an exploded perspective view illustrating a fender and a first bracket.

A fender 9 is provided above the rear-portion travel apparatus 32. The fender 9 covers above the rear-portion travel apparatus 32. The fender 9 has a right fender 9R that covers above the rear-portion travel apparatus 32 on a right side (right-rear wheel 32R) and a left fender (not illustrated) that covers above the rear-portion travel apparatus 32 on a left side (left-rear wheel). As illustrated in FIG. 1, the fender 9 has an upper plate portion 91, an outer plate portion 92, and an inner plate portion 93. The upper plate portion 91 is a portion that covers above the rear-portion travel apparatus 32 (rear wheel) and curves so as to move downward in heading forward. The outer plate portion 92 curves from an outward edge portion of the upper plate portion 91 and extends downward. The inner plate portion 93 curves from an inward edge portion of the upper plate portion 91 and extends downward.

A cabin 8 is provided to an upper portion of the vehicle body 2. Inside the cabin 8 is provided the driver's seat 16, a steering apparatus (steering handle) 17, and an operation lever (not illustrated). The operation lever is provided in a vicinity of the driver's seat 16 and operates a control valve (hydraulic instrument) 14 that is described below. The right fender 9R is provided rightward of the cabin 8. The left fender is provided leftward of the cabin 8.

As illustrated in FIG. 14, the cabin 8 has a front support 81, a rear support 82, an intermediate support 83, an upper frame 84, and a lower frame 85. The front support 81 is provided respectively to a right-front portion and a left-front portion of the cabin 8. The rear support 82 is provided respectively to a right-rear portion and a left-rear portion of the cabin 8. The intermediate support 83 is provided between the front support 81 and the rear support 82. Between the front support 81 and the intermediate support 83, a door panel 18 is openably installed. The upper frame 84 connects an upper portion of the front support 81, an upper portion of the rear support 82, and an upper portion of the intermediate support 83. The lower frame 85 has a lower-front member 86, a lower-rear member 87, and a fender support member 88. The lower-front member 86 is disposed in front of the fender 9 and extends rearward from a lower end portion of the front support 81. The lower-rear member 87 is disposed above the fender 9 and extends forward from a lower end portion of the rear support 82. The fender support member 88 connects the lower-front member 86 and the lower-rear member 87 and supports the fender 9.

A weight 15 is provided to the front portion of the vehicle body 2. Moreover, a front-mounted implement is mountable to the front portion of the vehicle body 2. Mountable is a front-mounted implement that performs work in front of the vehicle body 2 (for example, a sweeper used to process vegetation or the like). The front-mounted implement is provided with a hydraulic actuator driven by supply of a hydraulic fluid.

A three-point link mechanism 11 is provided to the rear portion of the vehicle body 2. The three-point link mechanism 11 is connected to a hydraulic cylinder 13 via a lift arm 12. A working apparatus that is not illustrated (such as a rotary tiller) is mountable to the three-point mechanism 11. This working apparatus is raised and lowered by the hydraulic cylinder 13 contracting and extending.

A hydraulic pump 10 and the control valve (hydraulic instrument) 14 are provided to the rear portion of the vehicle body 2. The hydraulic pump 10 is disposed to a rear portion in the transmission case 7. The control valve 14 is a valve unit integrating a plurality of valves. The control valve 14 is connected to the hydraulic pump 10. The control valve 14 controls supply of the hydraulic fluid from the hydraulic pump 10 to the working apparatus and the front-mounted implement based on an operation of the operation lever.

A rear-portion side (rear end portion) of hydraulic piping 20 is connected to the control valve 14. The hydraulic piping 20 circulates the hydraulic fluid, which is supplied from the hydraulic pump 10 to the front-mounted implement via the control valve 14.

Figure 2:
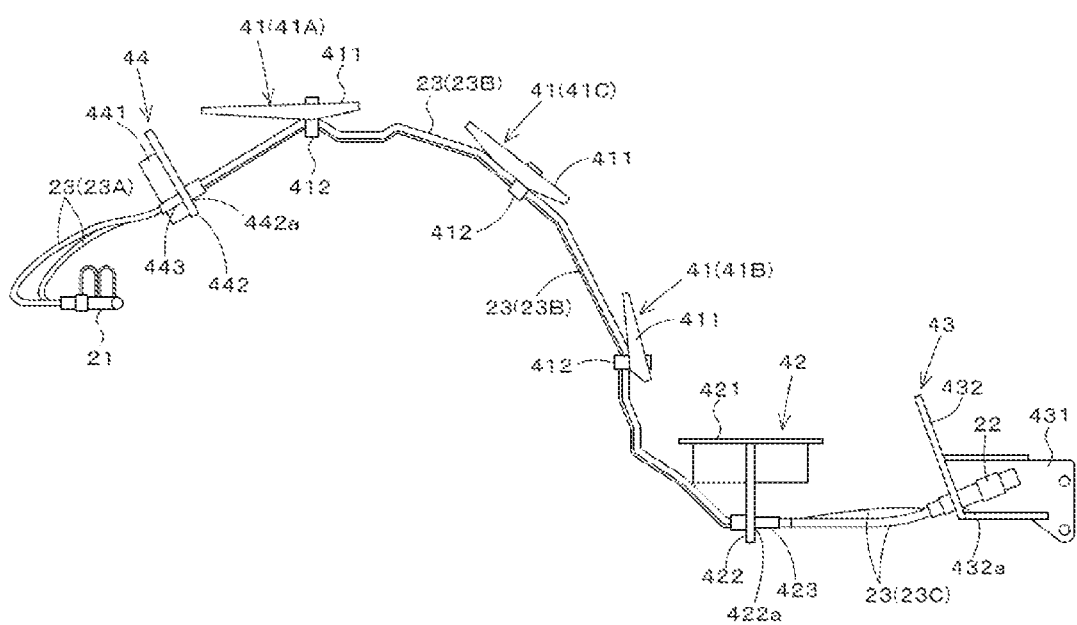
FIG. 2 is a side view illustrating one example of a support structure of hydraulic piping.
Figure 3:
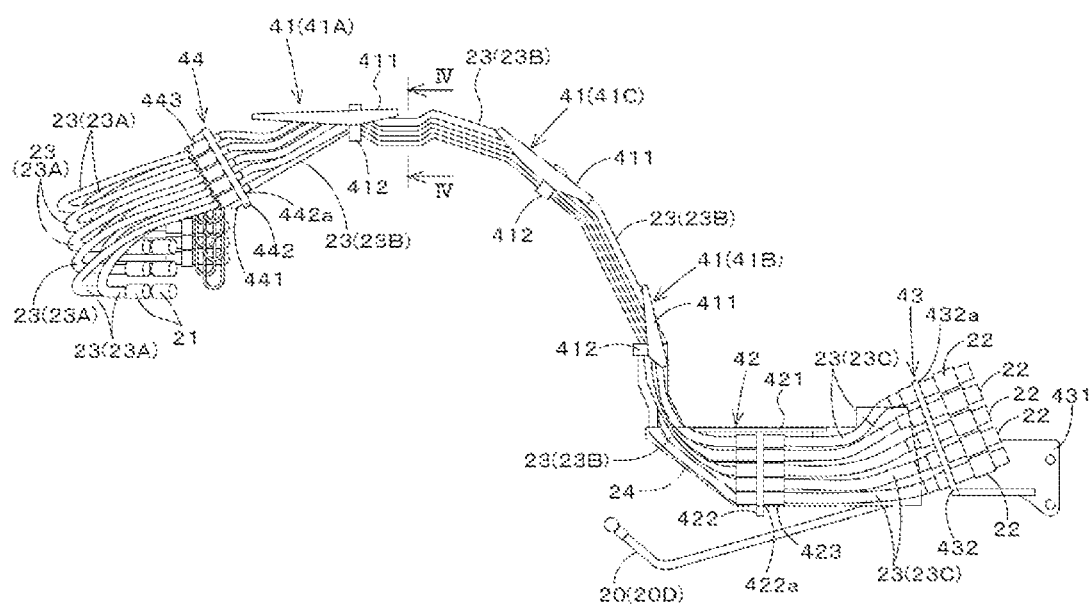
FIG. 3 is a side view illustrating another example of the support structure of the hydraulic piping.

As illustrated in FIGS. 2 and 3, the hydraulic piping 20 may include a plurality of pipes. Because the pipes configuring the hydraulic piping 20 may include a pipe that sends the hydraulic fluid to the front-mounted implement (sending pipe) and a pipe that returns the hydraulic fluid from the front-mounted implement (return pipe), at least two pipes are necessary; however, this number is not limited as long as it is two or more and this number is set according to specifications of the front-mounted implement and the like. FIG. 2 illustrates an example of a situation where the hydraulic piping 20 has two pipes, and FIG. 3 illustrates an example of a situation where the hydraulic piping 20 has eleven pipes. However, in FIG. 3, in a portion where the hydraulic piping 20 overlaps in a distal direction, there is a portion where an entirety of the hydraulic piping 20 is not seen. In the example illustrated in FIG. 3, the hydraulic piping 20 may include, in addition to five sending pipes and five return pipes, one drain pipe 20D that returns the hydraulic fluid to the hydraulic pump 10.

The hydraulic piping 20 has a first connecting portion 21, a second connecting portion 22, and a pipe member 23.

The pipe member 23 is configured by a hose and a pipe wherein the hydraulic fluid is circulated. In one or more embodiments, the pipe member 23 may include a rear-portion hose 23A, a pipe 23B, and a front-portion hose 23C. The rear-portion hose 23A and the front-portion hose 23C are configured from a soft material (flexible material) such as a rubber. The pipe 23B is configured from a hard material (rigid material) such as a metal. The pipe 23B connects the rear-portion hose 23A and the front-portion hose 23C. The pipe 23B is bent in a shape that roughly matches a curve of the fender 9 (substantially arcuate shape) between the rear-portion hose 23A and the front-portion hose 23C.

The first connecting portion 21 and the second connection portion 22 are configured from a coupler. In one or more embodiments, the first connection portion 21 is configured from a male coupler and the second connecting portion 22 is configured from a female coupler. The first connecting portion 21 is provided to the rear end portion of the hydraulic piping 20 and is connected to the control valve 14. The second connecting portion 22 is provided to a front end portion of the hydraulic piping 20 and is connectable to the hydraulic piping (not illustrated) connected to the front-mounted implement.

As illustrated in FIG. 14, the hydraulic piping 20 is between the travel apparatus 3 and the fender 9 and extends from a front-portion side to a rear-portion side of the fender 9. In one or more embodiments, the hydraulic piping 20 is between the right-rear wheel 32R of the rear-portion travel apparatus 32 and the fender 9R and extends from a front-portion side to a rear-portion side of the right fender 9R. However, the hydraulic piping 20 may be between the left-rear wheel and the left fender and extend from a front-portion side to a rear-portion side of the left fender.

As illustrated in FIGS. 2, 3, and 14, the hydraulic piping 20 is supported by a plurality of brackets. The plurality of brackets may include a first bracket 41, a second bracket 42, a third bracket 43, and a fourth bracket 44.

As illustrated in FIGS. 1 and 14, the first bracket 41 is installed to the fender 9. Specifically, the first bracket 41 is installed to the outer plate portion 92 of the fender 9. Note that in one or more embodiments, the first bracket 41 is installed to the right fender 9R but may be installed to the left fender. In a situation where the first bracket 41 is installed to the left fender, the hydraulic piping 20 is disposed between the rear-portion travel apparatus 32 on the left side (left-rear wheel) and the left fender.

As illustrated in FIGS. 2 and 3, the first bracket 41 has a plurality of brackets. In one or more embodiments, the first bracket 41 has three brackets (a rear bracket 41A, a front bracket 41B, an intermediate bracket 41C). The rear bracket 41A is installed to a rear portion of the fender 9. The front bracket 41B is installed to a front portion of the fender 9. The intermediate bracket 41C is installed to an intermediate portion of the fender 9 (between the rear bracket 41A and the front bracket 41B). Note that in one or more of the above embodiments, a number of first brackets 41 is three. However, the number of brackets may be one, two, or four or more.

The first bracket 41 (the rear bracket 41A, the front bracket 41B, and the intermediate bracket 41C) supports the pipe 23B of the hydraulic piping 20. The first bracket 41 has a substrate 411, a clamp 412, and a fixing member 413. The substrate 411 is installed by a bolt or the like to a surface on an inward side of the outer plate portion 92 of the fender 9. A shape of the substrate 411 is not limited in particular, but in the situation of one or more embodiments, the substrate 411 is formed into a substantially isosceles-triangle shape having one long side and two short sides. This substrate 411 is installed to the outer plate portion 92 so the long side faces an upper-plate-portion 91 side of the fender 9. The clamp 412 is configured from a first holding member 412A that holds an outer peripheral surface of the pipe 23B from one side and a second holding member 412B that holds the outer peripheral surface of the pipe 23B from another side. The pipe 23B is held by having the outer peripheral surface interposed by the first holding member 412A and the second holding member 412B. The fixing member 413 fixes the clamp 412 to the substrate 411. By this, the hydraulic piping (the pipe 23B) is held by the clamp 412 fixed to the substrate 411.

As illustrated in FIG. 14, the rear bracket 41A is installed to a highest portion of the fender 9 (below the lower-rear member 87), which curves in the substantially arcuate shape in a side view. The front bracket 41B is installed in a vicinity of a front end portion in a curving direction of the fender 9. The intermediate bracket 41C is installed in a substantially intermediate position (below a substantially intermediate position in a front-rear direction of the cabin 8) of the rear bracket 41A and the front bracket 41B in the curving direction of the fender 9.

The first bracket 41 supports the plurality of hydraulic pipes 20 (the pipe 23B) below the fender 9. The plurality of hydraulic pipes 20 supported by the first bracket 41 is disposed so height positions of hydraulic pipes 20 lined up in a width direction of the vehicle body 2 differ. Specifically, a height position of a hydraulic pipe 20 positioned outward in the width direction of the vehicle body 2 is set to be higher than a height position of a hydraulic pipe 20 positioned inward in the width direction of the vehicle body 2.

Figure 4:
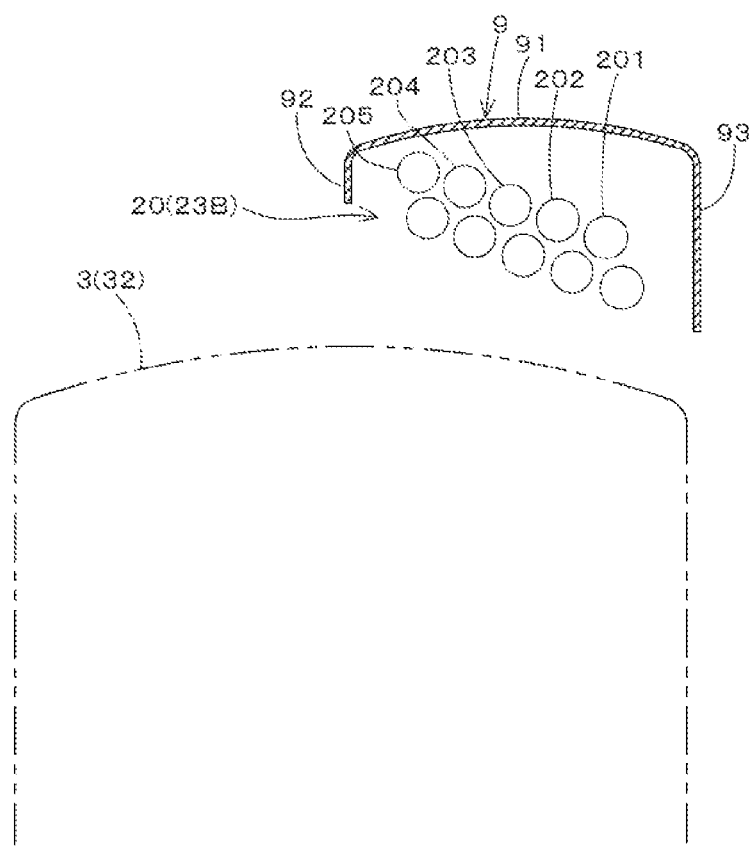
FIG. 4 is an explanatory diagram illustrating a disposition of the hydraulic piping below the fender.

FIG. 4 illustrates a disposition of the hydraulic piping 20 at the IV-IV portion in FIG. 3. In the example illustrated in FIG. 4, five hydraulic pipes 201 to 205 are lined up in the width direction of the vehicle body 2. Moreover, two hydraulic pipes are lined up in a vertical direction. In the situation of FIG. 4, the hydraulic pipe 201, which is disposed on an innermost side in the width direction of the vehicle body 2, is disposed in a lowest position; the hydraulic pipe 205, which is disposed on an outermost side, is in a highest position; and the hydraulic pipes 202 to 204 are in positions incrementally higher in heading toward an outer side in the width direction of the vehicle body 2. Moreover, hydraulic pipes 20 that differ in height and are adjacent are possibly provided with a gap by the height difference.

In this manner, by disposition being such that the height positions of the hydraulic pipes 20 lined up in the width direction of the vehicle body 2 below the fender 9 differ, even if dirt, sand, or the like kicked up by the travel apparatus 3 lands on top of the hydraulic piping 20, this dirt, sand, or the like can be caused to fall off using the height difference (slope) between the hydraulic pipes on an inner side and the hydraulic pipes on the outer side. Moreover, the dirt and the sand can be caused to fall out of the gaps between the adjacent hydraulic pipes. By this, dirt and sand become less likely to be deposited on an upper portion of the hydraulic piping 20. According to a disposition form of the hydraulic piping 20 of one or more embodiments, it becomes possible to dispose the plurality of hydraulic pipes 20 in a narrow space between the fender 9 and the travel apparatus 3 while preventing dirt and sand from being deposited on the hydraulic piping 20.

The number of hydraulic pipes 20 lined up in the width direction of the vehicle body 2 is set according to a total number of hydraulic pipes 20. For example, as in the example illustrated in FIG. 2, in a situation where the total number of hydraulic pipes 20 is two, the number of hydraulic pipes 20 lined up in the width direction of the vehicle body 2 is two. In this situation, of the two hydraulic pipes 20, the height position of one hydraulic pipe positioned outward is set to be higher than the height position of the other hydraulic pipe 20 positioned inward.

As illustrated in FIG. 1, when installing the first bracket 41 to the fender 9, the clamp 412 is disposed on an inward side and the substrate 411 is disposed on an outward side. By this, the hydraulic piping 20 can be effectively protected.

As illustrated in FIG. 14, the second bracket 42 is installed below the cabin 8. The second bracket 42 supports the hydraulic piping 20 in front of the fender 9 and to a side (rightward in one or more embodiments) of and below the cabin 8.

Figure 5:
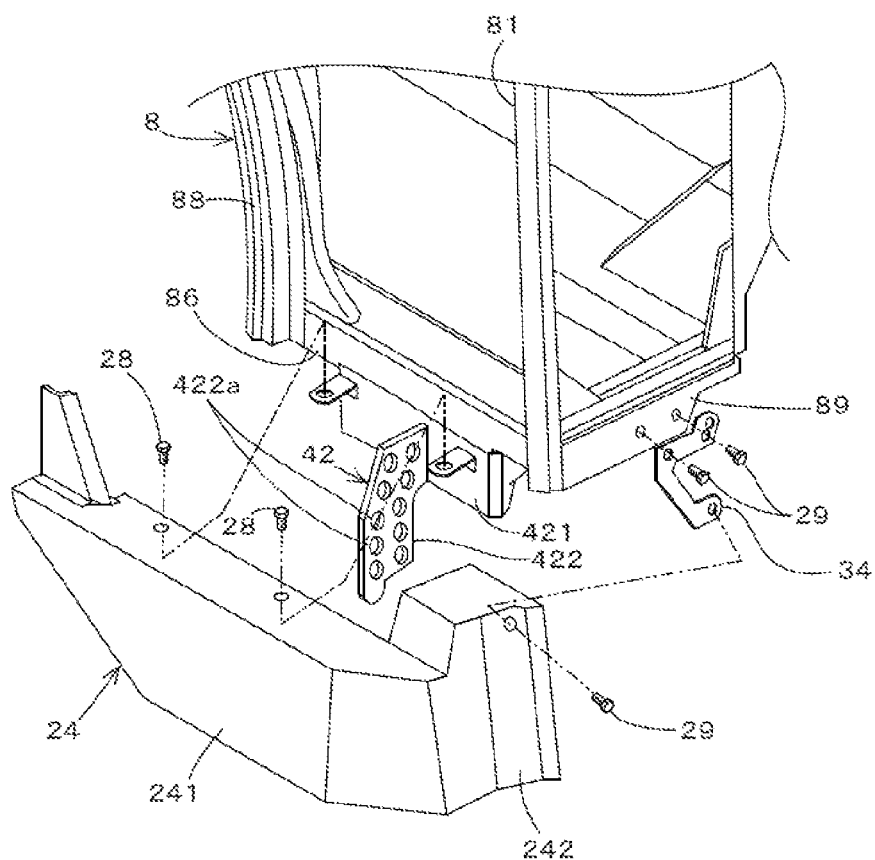
FIG. 5 is an exploded perspective view illustrating an installation structure of a second bracket and a cover to a cabin.

As illustrated in FIGS. 2, 3, and 5, the second bracket 42 has an installation portion 421 and a support portion 422. The installation portion 421 is installed to a lower portion of the lower-front member 86 of the lower frame 85 of the cabin 8. The support portion 422 extends outward and downward from an outward side surface of the installation portion 421 and is positioned below the lower frame 85 of the cabin 8. The support portion 422 is tabular and is disposed with one surface facing forward and another surface facing rearward. The support portion 422 has a plurality of through holes 422a. A number of through holes 422a is set according to the number of hydraulic pipes 20. As illustrated in FIGS. 2 and 3, a connecting member 423 is installed in the through hole 422a. The connecting member 423 connects a front end portion of the pipe 23B and a rear end portion of the front-portion hose 23C. By this, the hydraulic piping 20 is supported by the second bracket 42 in a connecting portion between the pipe 23B and the front-portion hose 23C. Because the support portion 422 is positioned below the lower frame 85 of the cabin 8, the hydraulic piping 20 supported by the second bracket 42 is disposed below the cabin 8. Because of this, the hydraulic piping 20 does not impede getting in and out when a worker gets in and out of the cabin 8.

As illustrated in FIGS. 3, 5, and 14, a side (rightward) of the second bracket 42 is covered by a cover 24. The cover 24 has a side portion 241 extending in a front-rear direction and a front portion 242 extending inward from a front end of the side portion 241. The side portion 241 is installed to the installation portion 421 of the second bracket 42 by a bolt 28. With the front portion 242, the cover 24 is installed to a horizontal member 89 extending inward from the lower end portion of the front support 81 on a right side of the cabin 8 by a bolt 29 via an installation plate 34. The cover 24 covers a side (rightward) of the hydraulic piping 20 over a range from a lower front portion of the fender 9 to a lower front portion of the cabin 8. By this, the worker contacting the pipe 23B and the front-portion hose 23C of the hydraulic piping 20 when getting in and out of the cabin 8 or the like can be prevented.

Figure 6:
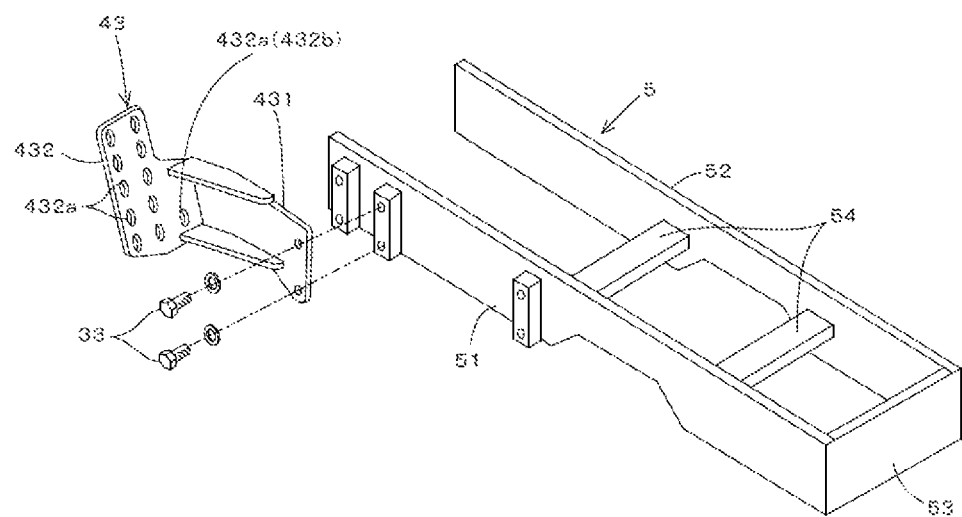
FIG. 6 is an exploded perspective view illustrating an installation structure of a third bracket to a vehicle-body frame.

As illustrated in FIGS. 6 and 14, the third bracket 43 is installed to the vehicle-body frame 5. The third bracket 43 is disposed in front of the second bracket 42 and rearward of the front-portion travel apparatus 31. The third bracket 43 supports the hydraulic piping 20 to a side (rightward in one or more embodiments) of the vehicle-body frame 5. The vehicle-body frame 5 has a right-side plate 51, a left-side plate 52, a front plate 53, and a connecting body 54. The right-side plate 51 is disposed to a right portion of the vehicle body 2 and extends in the front-rear direction. The left-side plate 52 is disposed to a left portion of the vehicle body 2 and extends in the front-rear direction. The front plate 53 connects a front portion of the right-side plate 51 and a front portion of the left-side plate 52. The connecting body 54 connects a front-rear-direction intermediate portion of the right-side plate 51 and a front-rear-direction intermediate portion of the left-side plate 52.

Figure 7:
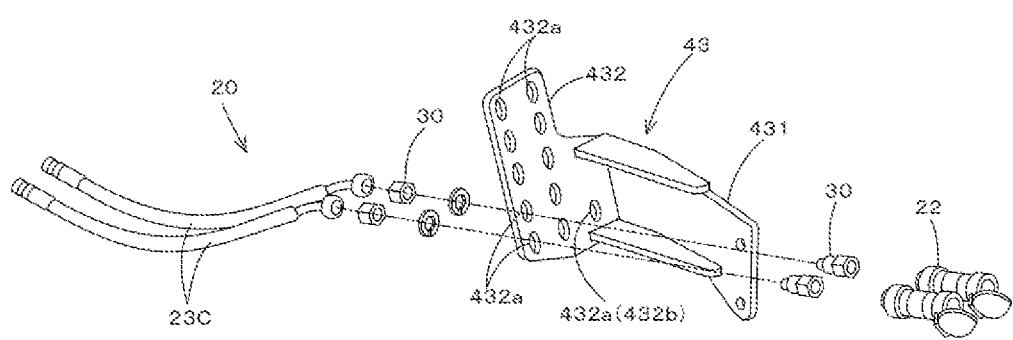
FIG. 7 is an exploded perspective view illustrating an installation structure of the hydraulic piping to the third bracket.
Figure 8:
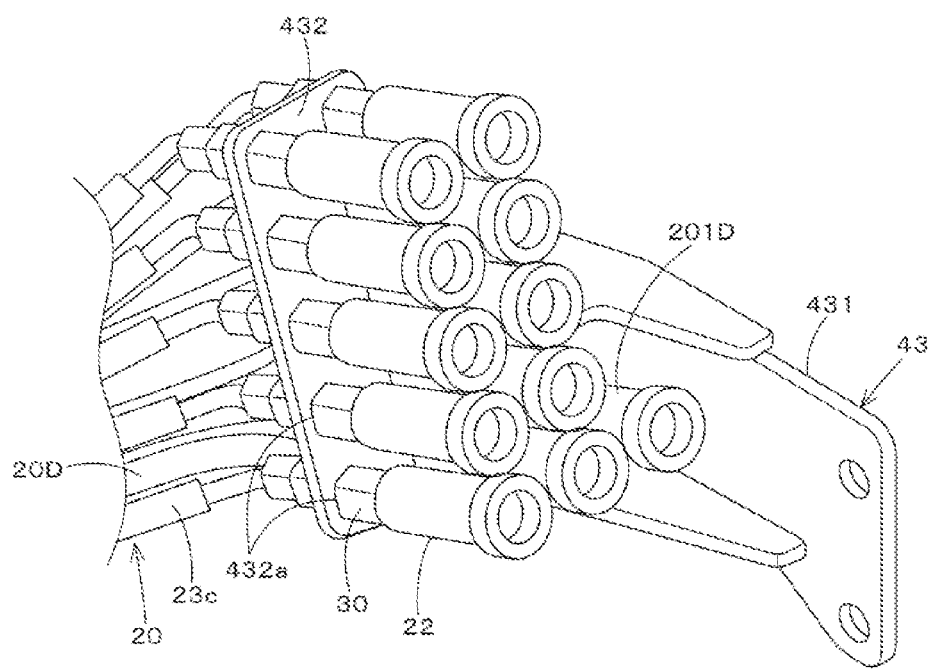
FIG. 8 is a perspective view illustrating the installation structure of the hydraulic piping to the third bracket.

As illustrated in FIG. 6, the third bracket 43 has an installation portion 431 and a support portion 432. The installation portion 431 is installed to a rear portion of the right-side plate 51 of the vehicle-body frame 5 by a bolt 33. The support portion 432 extends outward and upward from a rear end portion of the installation portion 431. The support portion 432 is tabular and is sloped so as to move forward in heading downward from above. The support portion 432, by sloping, has one surface facing forward and upward and another surface facing rearward and downward. The support portion 432 has a plurality of through holes 432a. A number of through holes 432a is set according to the number of hydraulic pipes 20. As illustrated in FIGS. 7 and 8, the second connecting portion 22 of the hydraulic piping 20 is supported in the through hole 432a. Specifically, a fitting 30 connecting the coupler configuring the second connecting portion 22 and the front-portion hose 23C is inserted into and supported by the through hole 432a. By this, the front end portion of the hydraulic piping 20 (second connecting portion 22) is supported by the third bracket 43.

The support portion 432 of the third bracket 43 may have a drain support portion 432b that supports the drain pipe 20D that returns the hydraulic fluid to the hydraulic pump 10. In the example illustrated in FIGS. 6 to 8, of the plurality of through holes 432a provided in the support portion 432, one configures the drain support portion 432b. FIG. 8 illustrates a coupler 201D connected to the drain pipe 20D supported by the drain support portion 432. The coupler 201D of the drain pipe 20D is connected to the hydraulic pump 10 when this hydraulic pump 10 is used by the front-mounted implement.

Figure 9:
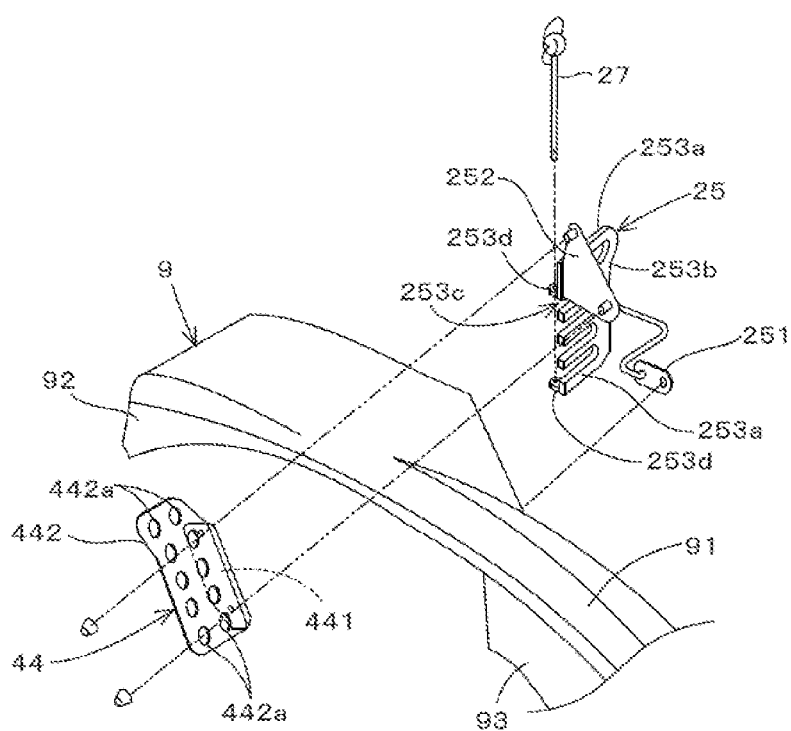
FIG. 9 is an exploded perspective view illustrating an installation structure of a fourth bracket and a piping holder to the fender.

As illustrated in FIGS. 9 and 14, the fourth bracket 44 is installed to the rear portion of the fender 9. The fourth bracket 44 supports the hydraulic piping 20 rearward of the rear bracket 41A of the first bracket 41.

As illustrated in FIG. 9, the fourth bracket 44 has an installation portion 441 and a support portion 442. The installation portion 441 is installed to the outer plate portion 92 of the fender 9 together with a piping holder 25 that is described below. The support portion 442 is tabular and is sloped so as to move forward in heading downward from above. The support portion 442, by sloping, has one surface facing forward and upward and another surface facing rearward and downward. The support portion 442 has a plurality of through holes 442a. A number of through holes 442a is set according to the number of hydraulic pipes 20. As illustrated in FIGS. 2 and 3, a connecting member 443 is installed in the through hole 442a. The connecting member 443 connects a rear end portion of the pipe 23B and a rear end portion of the rear-portion hose 23A. By this, the hydraulic piping 20 is supported by the fourth bracket 44 in a connecting portion between the pipe 23B and the rear-portion hose 23A.

In one or more embodiments, the first bracket 41 to the fourth bracket 44 are provided on a right side of the working machine 1 but may be provided on a left side. However, the first bracket 41 to the fourth bracket 44 are all provided on the same side (right side or left side) in the width direction of the working machine 1. By this, the hydraulic piping 20 can be extended from rearward to frontward and supported by the first bracket 41 to the fourth bracket 44 on the same side (right side or left side) in the width direction of the working machine 1.

In a state where the hydraulic piping 20 is supported by the first bracket 41 to the fourth bracket 44, among the hydraulic pipes 20, the pipe 23B is supported by the first bracket 41 in the space between the fender 9 and the travel apparatus 3. Because the pipe 23B has a higher rigidity than a hose (rear-portion hose 23A, front-portion hose 23C), it is prevented from curving downward (drooping) and contacting the travel apparatus 3 between adjacent first brackets 41 (between the rear bracket 41A and the intermediate bracket 41C, between the front bracket 41B and the intermediate bracket 41C). Moreover, a hose more flexible than the pipe 23B (the rear-portion hose 23A, the front-portion hose 23C) is disposed rearward of the fourth bracket 44 and in front of the third bracket 43. By this, when connecting the rear-portion hose 23A and the first connecting portion 21 and connecting the front-portion hose 23C and the second connecting portion 22, the flexibility of the hose can be used to perform connection readily.

Furthermore, the pipe 23B of the hydraulic piping 20, after extending forward from the rear portion of the fender 9 along the curve of the fender 9, extends further forward past the fender 9. That is, the pipe 23B having the high rigidity is used not only in a portion along the fender 9 (portion supported by the first bracket 41) but also in a portion in front of and past the fender 9 (portion not supported by first bracket 41). Because of this, prevented is a failure such as the hydraulic piping 20 drooping and contacting the ground in the portion in front of and past the fender 9 (portion not supported by the first bracket 41).

Furthermore, the rear end portion (portion supported by the fourth bracket 44) of the pipe 23B of the hydraulic piping 20 is positioned rearward of the highest portion of the fender 9. By this, the pipe 23B enters a state of being extended to a vicinity of a rear end portion of the fender 9; therefore, preventable is a failure such as the hydraulic piping 20 drooping and contacting the travel apparatus 3.

Figure 10:
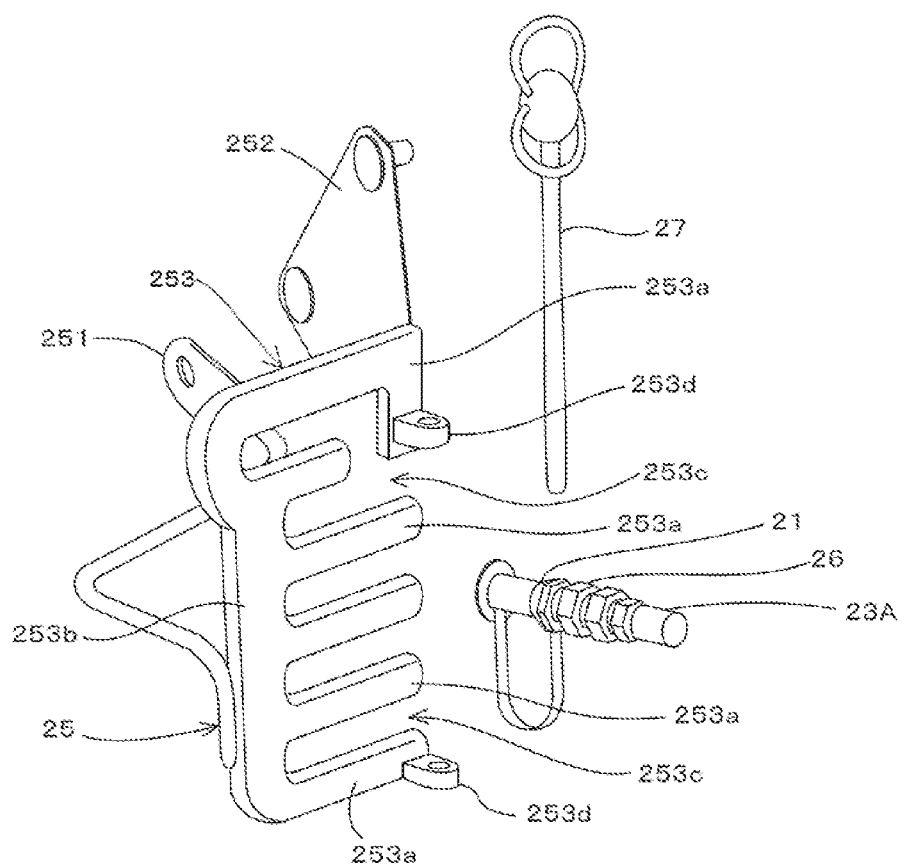
FIG. 10 is a perspective view of the piping holder and a first connecting portion.
Figure 11:
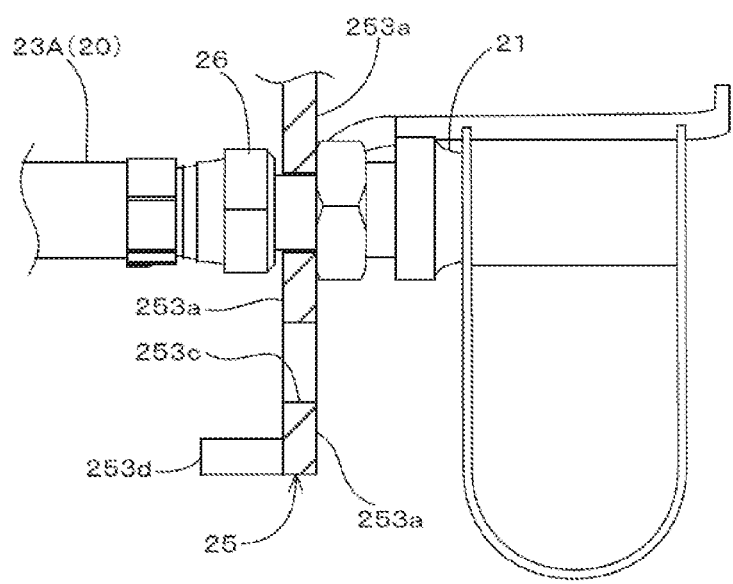
FIG. 11 is a vertical cross-sectional view illustrating a state where the hydraulic piping is held in the piping holder.
Figure 12:
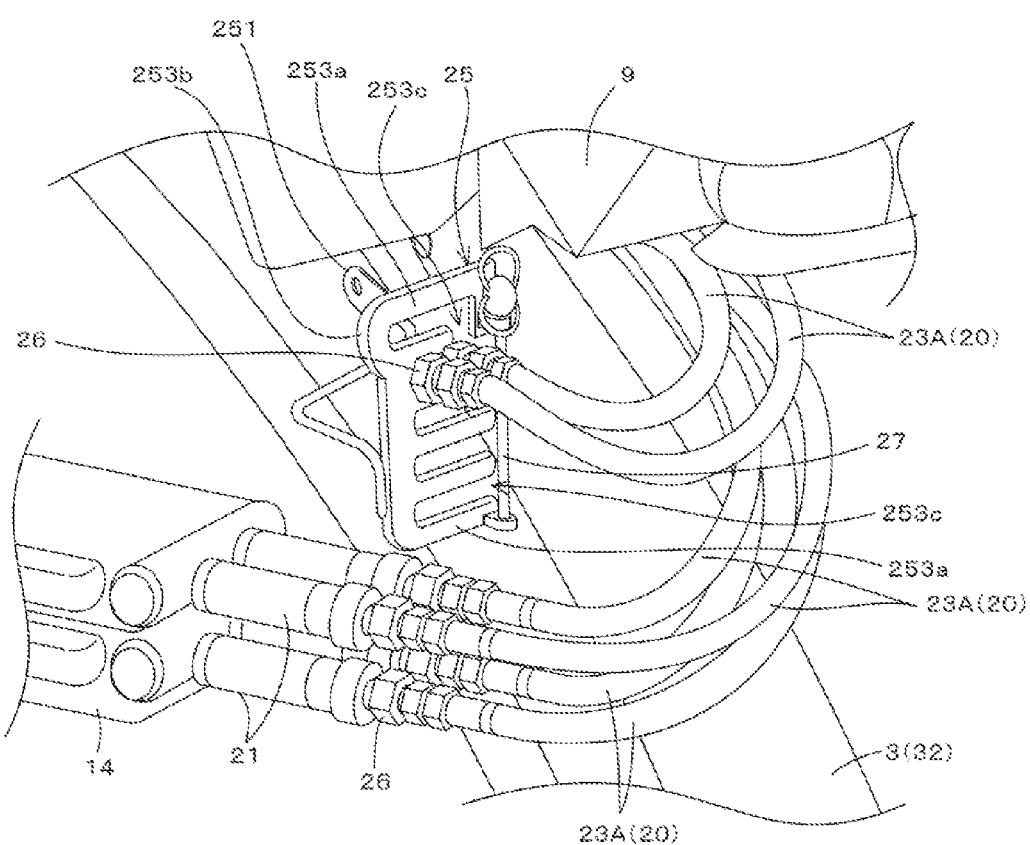
FIG. 12 is a perspective view illustrating one example of the state where the hydraulic piping is held in the piping holder.
Figure 13:
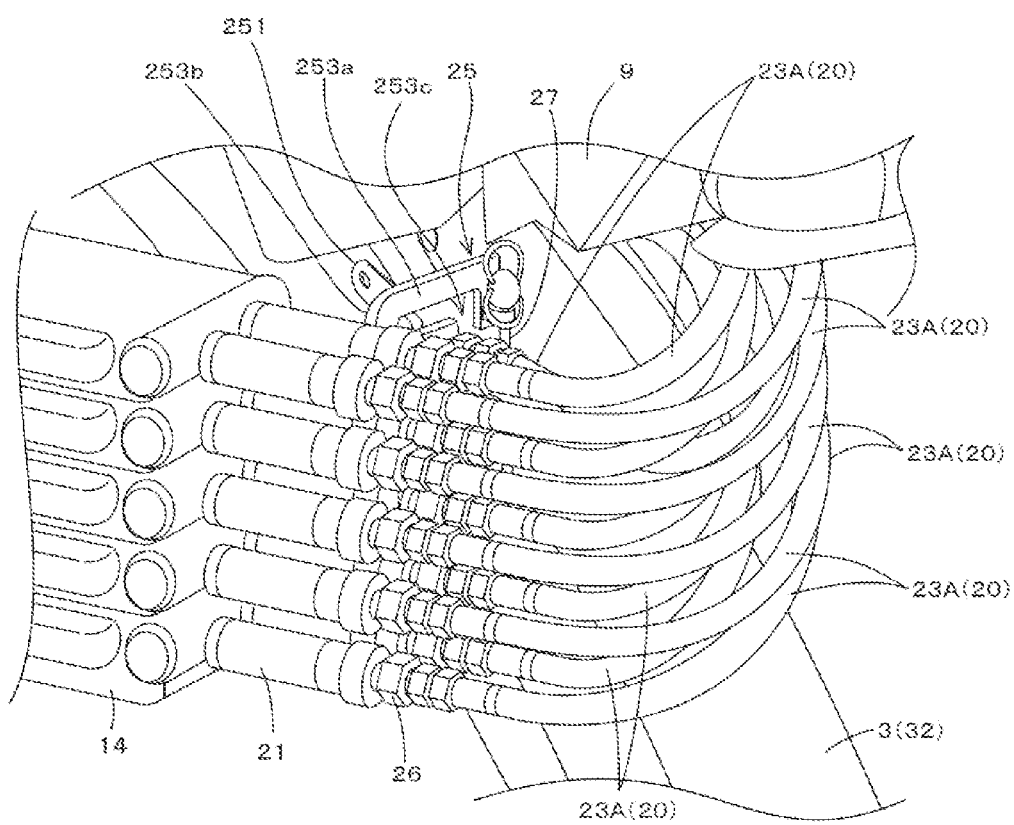
FIG. 13 is a perspective view illustrating another example of the state where the hydraulic piping is held in the piping holder.

As illustrated in FIGS. 9, 12, and 13, the piping holder 25 is installed to the rear portion of the fender 9. As illustrated in FIGS. 9 and 10, the piping holder 25 has a first installation portion 251, a second installation portion 252, and a holding portion 253. The first installation portion 251 is installed to the outer plate portion 92 of the fender 9. The second installation portion 252 has the installation portion 441 of the fourth bracket 44 installed thereto. The holding portion 253 has a plurality of holding rods 253*a* and a connecting portion 253*b*. The plurality of holding rods 253*a* is disposed at intervals in the vertical direction from and parallel to each other and extends from outward to inward. The connecting portion 253*b* extends in the vertical direction and connects a base-end side (outward side) of the plurality of holding rods 253*a*. A holding groove 253*c* is formed between holding rods 253*a* adjacent in the vertical direction. A number of holding grooves 253*c* is set in consideration of the number of hydraulic pipes 20. The holding groove 253*c* has an outward side open and an inward side closed by the connecting portion 253*b*. By this, as illustrated in FIGS. 11 to 13, a rear-end side (first-connecting-portion 21 side) of the hydraulic piping 20 can be inserted into and held (locked) by the holding groove 253*c* from the outward side. Specifically, a fitting 26 connecting the coupler configuring the first connecting portion 21 and the rear-portion hose 23A can be inserted into and held (locked) by the holding groove 253*c*. Moreover, a protruding portion 253*d* having a through hole is provided on a tip side (outward side) of holding rods 253*a* of an uppermost portion and a lowermost portion. As illustrated in FIG. 12, by inserting a rod body 27 for retention into the through holes provided in the protruding portions 253*d*, an outward side of the holding groove 253*c* is closed by the rod body 27. By this, the hydraulic piping 20 falling out of the holding groove 253*c* can be prevented.

As illustrated in FIGS. 12 and 13, of the plurality of hydraulic pipes 20, a hydraulic pipe 20 not connected to the control valve (hydraulic instrument) 14 is held by the holding portion 253 of the piping holder 25. The hydraulic piping 20 is connected to the control valve 14 to supply the hydraulic fluid to the front-mounted implement, but in a situation where there is hydraulic piping not used by the front-mounted implement, connection to the control valve 14 is released for this hydraulic piping. This hydraulic piping 20 where connection to the control valve 14 is released is held by the holding portion 253 of the piping holder 25. By this, the hydraulic piping 20 where connection to the control valve 14 is released drooping or the like to contact the travel apparatus 3 can be prevented.

According to the working machine 1 above, by the hydraulic piping 20 being between the travel apparatus 3 and the fender 9 and extending from the front-portion side to the rear-portion side of the fender 9, the hydraulic fluid can be readily supplied from the rear portion to the front portion of the vehicle body 2 through the hydraulic piping 20 without passing the hydraulic piping 20 inside the vehicle body 2 from the rear portion to the front portion. Moreover, because the hydraulic piping 20 is supported by the fender 9, the hydraulic piping 20 can be supported stably and a portion or the entirety of the hydraulic piping 20 can be protected by the fender 9.

Furthermore, because the hydraulic piping 20 can be extended frontward from the control valve 14 provided to the rear portion of the vehicle body 2, there is no need to separately provide a control valve for the front-mounted implement to the front portion of the vehicle body 2 and space can be effectively utilized.

A structural body combining the hydraulic piping 20 and the first bracket 41 to the fourth bracket 44 in one or more of the embodiments above (see FIGS. 2 and 3) can also be used as a kit that can be retrofitted to the working machine 1. In this situation, this kit can be used by being retrofitted to the working machine 1 when mounting an implement to the front portion of the vehicle body 2.

In one or more embodiments, a working machine, comprises a vehicle body (2); a travel apparatus (3) arranged on a rearward portion of the vehicle body (2); a fender (9) arranged above the travel apparatus (3); and hydraulic piping (20) disposed between the travel apparatus and the fender, and extending between a forward-portion and a rearward-portion of the fender.

The vehicle body is provided with the travel apparatus which is typically at least a pair of right-left wheels. The pair of wheels is disposed at the rearward portion of the vehicle body with respect to a travel direction of the vehicle body. The hydraulic piping extends above either one of the pair of wheels. Therefore, the hydraulic piping is located close to the right or left side edge of the vehicle body. In the practice, the hydraulic piping extends from an operation tool (lever) to be operated by a driver (worker) in the vehicle body. Accordingly, the hydraulic piping is possibly disposed on the same side as the operation tool (lever) is disposed with respect to the lateral direction of the vehicle body.

Directions such as forward, rearward, front, back, lateral, right, left, upper, lower, above, and below are referred to with respect to the travel direction of the vehicle body in the entire description.

Furthermore, in one or more embodiments, the hydraulic piping (20) has a plurality of hydraulic pipes (201, 202, 203, 204, 205), and the plurality of hydraulic pipes is disposed below the fender (9) so that height positions of the plurality of hydraulic pipes lined up in a lateral direction of the vehicle body differ.

The plurality of hydraulic pipes is disposed below the fender so that height positions of the plurality of hydraulic pipes lined up in a width direction of the vehicle body differ. In other words, the plurality of hydraulic pipes is positioned at different height levels within a vertical cross section intersecting with the travel direction of the vehicle body.

The dirt, sand, or the like can fall off from the hydraulic pipes. Moreover, the dirt and sand can fall out of the gaps between the adjacent hydraulic pipes. Accordingly, dirt and sand become less likely to be deposited on the hydraulic piping.

In one or more embodiments, the hydraulic piping (20) has a plurality of hydraulic pipes (201, 202, 203, 204, 205), the plurality of hydraulic pipes is disposed below the fender (9), and the plurality of hydraulic pipes is arranged such that an imaginary surface inclines to drop foreign particles from upper surfaces of the plurality of hydraulic pipes, the imaginary surface contacting with and covering the upper surfaces of the plurality of hydraulic pipes.

In other words, the imaginary surface inclines such that the foreign particles deposited on the plurality of hydraulic pipes are to slide along the upper surfaces of the plurality of hydraulic pipes and fall down therefrom. The foreign particles are typically dirt such as dusts, stones, and sand.

Possibly, within a vertical cross section, an upper envelope of the plurality of hydraulic pipes inclines so as to drop off foreign particles from the piping. The vertical cross section intersects with the travel direction of the vehicle body. Possibly, the vertical cross section extends along the lateral direction of the vehicle body. The upper envelope is an imaginary line which, within the vertical cross section, covers and contacts with the upper surfaces of the plurality of hydraulic pipes.

Possibly, each height of the hydraulic pipes stepwisely changes within the vertical cross section such that foreign particles such as dusts, stones, and sand are to slide along the upper envelope and fall down from the piping.

Furthermore, within the vertical cross section, each height of the plurality of hydraulic pipes stepwisely lowers from the most outward pipe toward the most inward pipe with respect to the lateral direction of the vehicle body.

In one or more embodiments, the hydraulic piping (20) has a plurality of hydraulic pipes (201, 202, 203, 204, 205), the plurality of hydraulic pipes is disposed below the fender (9) in a form layers, and at least the hydraulic pipes forming the most upper layer are arranged such that: height positions of the hydraulic pipes lined up in the lateral direction of the vehicle body differ, and/or an imaginary surface inclines to drop foreign particles from upper surfaces of the hydraulic pipes, the imaginary surface contacting with and covering the upper surfaces of the hydraulic pipes.

In the case where hydraulic pipes overlap with each other in a form of layers which has one layer over another, at least the hydraulic pipes forming the most upper layer are arranged so as to drop off the foreign particles therefrom. Possibly, the hydraulic pipes constituting each layer are arranged to do the same.

In this way of arrangement, the plurality of hydraulic pipes can be disposed in a narrow space between the fender and the travel apparatus while preventing the foreign particles from being deposited on the hydraulic piping.

Possibly, the plurality of hydraulic pipes is positioned at different height levels within any vertical cross section which intersects with the travel direction of the vehicle body at any position below the fender.

In one or more embodiments, the invention may further comprise a first bracket (41) attached to the fender (9) and supporting the hydraulic piping (20) below the fender.

In one or more embodiments, the invention may further comprise: a cabin (8) arranged at an upper portion of the vehicle body (2); and a second bracket (42) attached to a lower portion of the cabin and supporting the hydraulic piping (20) at a position forward of the fender (9) and on a side of the cabin.

The second bracket supports the hydraulic piping at a position below the cabin. Accordingly, the hydraulic piping does not impede a driver (worker) who gets in and out of the cabin.

Possibly, a cover covers the second bracket and partially the hydraulic piping over a range from a lower forward portion of the fender to a lower forward portion of the cabin. Accordingly, it enables the driver (worker) to get in and out of the cabin without contacting the hydraulic piping.

In one or more embodiments, the invention may further comprise: a front wheel (31) arranged at a forward portion of the vehicle body (2); a vehicle-body frame (5) attached to the vehicle body (2) and supporting the front wheel; and a third bracket (43) attached to the vehicle-body frame and supporting the hydraulic piping (20) on a side of the vehicle-body frame (5).

In one or more embodiments, the invention may further comprise: a hydraulic pump (10) arranged at the rearward portion of the vehicle body (2), wherein the hydraulic piping (20) may include a drain pipe (20D) configured to return a hydraulic fluid to the hydraulic pump (10), and the third bracket (43) may include a drain support portion (432b) that supports the drain pipe (20D).

In one or more embodiments, the invention may further comprise: a hydraulic instrument (14) arranged at the rearward portion of the vehicle body (2), a rearward-portion of the hydraulic piping (20) being connected to the hydraulic instrument (14); and a piping holder (25) attached to the fender (9) and having a holding portion (253c), the holding portion (253c) holding the hydraulic piping (20) such that the hydraulic piping (20) is not connected to the hydraulic instrument (14).

The hydraulic piping can be prevented from dropping and contacting the vehicle body when its connection to the control valve is released. Each pipe among the hydraulic piping is alternatively connected to either one of the hydraulic instrument and the piping holder. In other words, the piping holder is configured to hold one or more pipes among the hydraulic piping which are not connected to the hydraulic instrument. Likewise, the hydraulic instrument is configured to hold one or more pipes among the hydraulic piping which are not connected to the piping holder.

Possibly, the piping holder is attached to the rearward portion of the fender. Furthermore, the piping holder is fixed to the rearward portion of the fender and a fourth bracket. The fourth bracket is attached to the fender at its highest position and supports the hydraulic piping.

Possibly, the piping holder has a holding portion which has a plurality of holding rods and a connecting portion. The plurality of holding rods is parallelly disposed at intervals so as to form holding grooves between adjacent holding rods. The connecting portion connects and supports each of the plurality of holding rods at an end thereof. the vertical direction.

Furthermore, the connecting portion extends along the substantially vertical direction and supports the plurality of holding rods at their inward ends with respect to the lateral direction of the vehicle body. In other words, the connecting portion supports the plurality of rods such that the holding grooves open laterally and outwardly. Accordingly, a rearward-end of the hydraulic piping can be easily inserted from outside into the holding grooves and held therein. The connecting portion may incline from the vertical direction to the extent that the hydraulic piping can be inserted into and removed from the holding grooves from outside on the right or left side of the vehicle body.

In one or more embodiments, the hydraulic instrument (14) is a control valve that is configured to control supply of the hydraulic fluid through the hydraulic piping (20).

While embodiments of the present invention are described above, the embodiments disclosed herein are merely examples, and should not be considered to be limiting. The scope of the present invention is indicated not by the above description but by the scope of patent claims, and it is intended that meanings equivalent to the scope of patent claims and all changes within the scope are included.

REFERENCE SIGNS LIST

1 Working machine
2 Vehicle body
3 Travel apparatus
31 Front-portion travel apparatus (front wheel)
32 Rear-portion travel apparatus
5 Vehicle-body frame
8 Cabin
9 Fender
10 Hydraulic pump
14 Hydraulic instrument (control valve)
20 Hydraulic piping
20D Drain pipe
21 First connecting portion
22 Second connecting portion
25 Piping holder
41 First bracket
42 Second bracket
43 Third bracket
432b Drain support portion

The invention claimed is:

1. A working machine, comprising:
a vehicle body;
a travel apparatus provided on a rear portion of the vehicle body;
a fender provided above the travel apparatus in a vertical direction of the working machine; and
hydraulic piping that is disposed between the travel apparatus and the fender, wherein a portion of the hydraulic piping is disposed below a lower terminal end of the fender,
wherein the hydraulic piping comprises a first hydraulic pipe and a second hydraulic pipe,
wherein the working machine further comprises:
a control valve that is provided on the rear portion of the vehicle body, wherein a rear-portion side of the first hydraulic pipe is connected to the control valve; and
a piping holder that is installed on the fender and comprises a holding portion that holds the second hydraulic pipe that is not connected to the control valve, and
wherein the control valve controls supply of a hydraulic fluid through the hydraulic piping.

2. The working machine according to claim 1,
wherein the hydraulic piping comprises a plurality of hydraulic pipes,
wherein the plurality of hydraulic pipes is disposed below the fender,
wherein the plurality of hydraulic pipes is lined up in a width direction of the vehicle body and is in higher positions at an outer side of the width direction.

3. The working machine according to claim 2, further comprising:
a first bracket that is installed to the fender and supports the hydraulic piping below the fender.

4. The working machine according to claim 2, further comprising:
a cabin provided to an upper portion of the vehicle body; and
a second bracket that is installed to a lower portion of the cabin and that supports the hydraulic piping in front of the fender and to a side of the cabin.

5. The working machine according to claim 2, further comprising:
a front wheel provided on a front portion of the vehicle body;
a vehicle-body frame that supports the front wheel; and
a third bracket that is installed on the vehicle-body frame and that supports the hydraulic piping to a side of the vehicle-body frame.

6. The working machine according to claim 1, further comprising:
a first bracket that is installed to the fender and supports the hydraulic piping below the fender.

7. The working machine according to claim 6, further comprising:
a cabin provided to an upper portion of the vehicle body; and
a second bracket that is installed to a lower portion of the cabin and that supports the hydraulic piping in front of the fender and to a side of the cabin.

8. The working machine according to claim 6, further comprising:
a front wheel provided on a front portion of the vehicle body;
a vehicle-body frame that supports the front wheel; and
a third bracket that is installed on the vehicle-body frame and that supports the hydraulic piping to a side of the vehicle-body frame.

9. The working machine according to claim 1, further comprising:
a cabin provided to an upper portion of the vehicle body; and
a second bracket that is installed to a lower portion of the cabin and that supports the hydraulic piping in front of the fender and to a side of the cabin.

10. The working machine according to claim 9, further comprising:
a front wheel provided on a front portion of the vehicle body;
a vehicle-body frame that supports the front wheel; and
a third bracket that is installed on the vehicle-body frame and that supports the hydraulic piping to a side of the vehicle-body frame.

11. The working machine according to claim 1, further comprising:
a front wheel provided on a front portion of the vehicle body;

a vehicle-body frame that supports the front wheel; and a third bracket that is installed on the vehicle-body frame and that supports the hydraulic piping to a side of the vehicle-body frame.

12. The working machine according to claim 11, further comprising:

a hydraulic pump provided to the rear portion of the vehicle body, wherein the hydraulic piping comprises a drain pipe that returns a hydraulic fluid to the hydraulic pump, and wherein the third bracket comprises a drain support portion that supports the drain pipe.

13. The working machine according to claim 1, wherein the hydraulic piping sends a hydraulic fluid to a front-mounted implement and returns the hydraulic fluid from the front-mounted implement.

14. The working machine according to claim 1, wherein a portion of the hydraulic piping is disposed below a rear terminal end of the fender.

* * * * *